United States Patent Office 3,703,574
Patented Nov. 21, 1972

3,703,574
PROCESS FOR THE PREPARATION OF STABILIZERS FOR HALOGEN-CONTAINING SYNTHETIC RESINS
Andre S. van den Berg, North Beegden, Netherlands, assignor to N.V. Chemische Fabriek v/h Dr. A. Haagen, Roermond, Netherlands
No Drawing. Filed Dec. 23, 1968, Ser. No. 786,476
Claims priority, application Netherlands, Dec. 22, 1967, 6717564
Int. Cl. C01g 21/16, 21/20; C08d 11/04
U.S. Cl. 423—462                                              8 Claims

ABSTRACT OF THE DISCLOSURE

This invention relates to a process for the preparation of complex basic lead compounds to be applied as stabilizers for halogen-containing synthetic resins, in which process a suspension of lead oxide in water is reacted at increased temperatures with hydrochloric acid in the presence of a small amount of a lower aliphatic carboxylic acid, and optionally in the presence of one or more other inorganic acids and/or one or more other organic acids, and the hardly soluble reaction product formed is separated from the reaction mixture, whereby the amount of hydrochloric acid added is such that the chlorine content of the obtained product amounts to 1.5–5.5 percent by weight.

---

The invention relates to a process for the preparation of stabilizers for halogen-containing synthetic resins, in particular for synthetic resins in which homopolymers or copolymers of vinyl chloride form the sole or chief constituent, as well as for the stabilization of such synthetic resins.

Among the many stabilizers and stabilizer compositions for halogen-containing synthetic resins which have become known in the course of the years, the basic lead salts occupy an important position. In these well-known stabilizers, of which, inter alia, monobasic and tribasic lead sulphate, dibasic lead phosphite, basic lead carbonate, basic lead silicate and dibasic lead phthalate may be mentioned s examples, the lead present is always bound partly as lead oxide PbO and for the remaining part to one or more organic or inorganic acid residues. The lead oxide also in itself has a good stabilizing action, but it has a few drawbacks which have prevented it from being widely applied. In particular, the high apparent density of lead oxide considerably decreases the dispersibility of the product in the synthetic resin.

In general, the well-known basic lead salts mentioned show this drawback of a high apparent density to a lesser extent, but sometimes they have other disadvantages which prevent them from being used as stabilizers in certain applications. In this way, to quote an example, when some of these lead salts are used, the electrical insulation properties of products made of synthetic resins stabilized with these compounds are less satisfactory.

The invention now aims at providing a process for the preparation of basic lead compounds which, through a combination of a low apparent density, high electric resistance and a good heat-stabilizing activity lend themselves excellently for application as stabilizers for halogen-containing synthetic resins.

According to the invention, the process for the preparation of complex basic lead compounds to be applied as stabilizers for halogen-containing synthetic resins is characterized by the fact that a suspension of lead oxide in water is made to react at increased temperatures with hydrochloric acid in the presence of a small amount of a lower aliphatic carboxylic acid and that the hardly soluble reaction product formed is separated from the reaction mixture, in which process the amount of hydrochloric acid added is such that the chlorine content of the product obtained in this way amounts to 1.5–5.5 percent by weight.

The products obtained in this way may be considered to be lead oxide-lead chloride complexes having a high basicity. Although it is possible to obtain complexes of varying compositions in this way, it has appeared that heptabasic lead chloride ($7PbO \cdot PbCl_2$) is preferably formed as a white precipitate. The apparent density of this heptabasic lead chloride is considerably less than that of the lead oxide to be used for the preparation, which makes it possible for it to be dispersed in synthetic resins with considerably greater ease.

According to the invention complex basic lead compounds can also be prepared by adding to the reaction mixture of lead oxide and hydrochloric acid one or more other inorganic acids, e.g. sulphuric acid, sulphurous acid, phosphoric acid or phosphorous acid and/or one or more other organic acids, e.g. adipic acid, lauric acid, palmitic acid, stearic acid or phthalic acid, the lead salts of which are hadly soluble. These other acids can be added before, simultaneously with, or after the addition of the hydrochloric acid.

Within the limits of the chlorine content indicated it is possible in this way to prepare lead oxide-lead chloride-lead salt complexes which, owing to their low apparent density and high electric resistance yield very good stabilizers for halogen-containing synthetic resins. In particular, products obtained by the reaction of lead oxide with mixtures of hydrochloric acid and sulphuric acid, such as lead oxide-lead chloride-lead sulphate complexes having a chlorine content of 1.5–4.0 percent by weight and an $SO_4$ content of 4.8–9.6 percent by weight, may advantageously be applied as such.

As has already been stated, the basic lead compounds according to the invention are prepared at increased temperatures. In general, it is recommended to use temperatures between 50 and 80° C. A small amount of an aliphatic carboxylic acid, preferably formic acid or acetic acid, is added as a catalyst during the reaction. The divalent lead still in solution may be precipitated by a suitable agent, e.g. by means of an ammonium compound.

The products prepared according to the invention may be added as stabilizers to halogen-containing synthetic resins in every usual way, in doing which as a result of the low apparent density there is always a rapid and effective mixture. The products are added in the usual amounts, e.g. in amounts of 0.5–10 parts by weight, preferably 1–5 parts by weight, of stabilizer per 100 parts of the synthetic resin.

The stabilizers prepared according to the invention can be applied in combination with other usual auxiliary substances, such as anti-oxidants, lubricants and other stabilizers.

The invention will be further illustrated by means of the following examples.

EXAMPLE 1

0.017 g. mol. acetic acid are added to a suspension of 89 g. PbO in 0.5 l. water heated at a temperature of 60° C., and after a few minutes, while stirring continuously, a start is made with the addition of a total of 0.1 g. mol. HCl (as a concentrated solution). Initially, the hydrochloric acid is dosed drop by drop to be continued at a greater rate after the reaction has got under way. During the reaction, a hardly soluble white product is precipitated. When the reaction is completed, the lead still present in solution is precipitated by the addition of 5 ml. of 25% $NH_4OH$, after which the solid product is filtered off, washed out and dried. When drying, the filter cake disintegrates into a white powder having an apparent density of 0.29 g./cm.³. This product can very easily be dispersed in polyvinyl chloride.

The heat-stabilizing activity of the product is compared with that of a known lead-containing stabilizer, viz tribasic lead sulphate, by adding samples of both to plasticized sheets of polyvinyl chloride on a double roller mill in an amount of 3 parts to 100 parts of the synthetic resin, and by heating these sheets in an oven at a temperature of 190° C. In both cases, the brown discolouration which manifests itself is practically the same after 120 minutes.

At the same time, the electrical volume resistance of both samples of stabilized polyvinyl chloride is determined according to British Standard 2782, part 2, method 202ᴬ, the measurement being carried out at a temperature of 23° C. The following results are obtained:

| | Ohm cm. |
|---|---|
| Basic lead chloride | $6.0 \times 10^{13}$ |
| Tribasic lead sulphate | $4.1 \times 10^{13}$ |

EXAMPLE 2

A suspension of 446 g. PbO in 2.5 l. water is heated to 65° C., which temperature is maintained during the rest of the reaction. 5 ml. of 80% acetic acid, 50 g. of 98% $H_2SO_4$ (previously diluted with water), and, after a short interval, 50 ml. of 30% HCl are successively added to this suspension. After fifteen minutes' stirring, the reaction is brought to a close and 5 g. $NH_4Cl$ are added. The white reaction product is filtered off, washed out and dried at a temperature of 120° C. Practically, the quantitative yield of basic lead chloride/sulphate with the composition $5PbO \cdot 2PbSO_4 \cdot PbCl_2$ is obtained. The apparent density amounts to 0.43 g./cm.³.

In a similar way, a product free from chlorine is obtained by the reaction at a temperature of 65° C. of a suspension of 446 g. PbO in 2.5 l. water, to which have been added 5 ml. of 80% acetic acid, with 50 g. of 98% $H_2SO_4$. In this case, after 15 minutes' stirring, 5 g. $(NH_4)_2SO_4$ are added, after which the product is similarly filtered off, washed out and dried. The apparent density of the tribasic lead sulphate obtained in this way amounts to 0.53 g./cm.³.

A sample of both products is added as a stabilizer to a plasticized sheet of polyvinyl chloride on a double roller mill in an amount of 3 parts to 100 parts of the synthetic resin. In this way, it appears that the chlorine-containing product is clearly more easily dispersible in the synthetic resin than the product free from chlorine.

The electrical volume resistance of the stabilised polyvinyl chloride sheets obtained in this way is determined in accordance with the method referred to in Example 1, the measurements being carried out at temperatures of 23° C. and 60° C. The following results are obtained:

| | 23° C., ohm²·cm. | 60° C., ohm⁴·cm. |
|---|---|---|
| Chlorine-containing product | $27 \times 10^{13}$ | $75 \times 10^{11}$ |
| Product free from chlorine | $6.3 \times 10^{13}$ | $29 \times 10^{11}$ |

At the same time, the thermal stability of the stabilised polyvinyl chloride sheets obtained in this way is compared when being heated for a long period of time at a temperature of 180° C., in which the discolouration manifesting itself serves as a yardstick. In this respect, the chlorine-containing product appears to be a little less effective than the product free from chlorine, although the former yet also shows a very good heat-stabilizing activity.

EXAMPLE 3

In the same way as described in Example 2, a complex basic lead compound is prepared by means of the reaction of a suspension of 446 g. PbO in 2.5 l. water, to which 5 ml. of acetic acid are added, with successively 50 ml. of 36% HCl and 40 g. of $H_3PO_3$. The basic lead chloride/phosphite having the composition $5PbO \cdot 2PbHPO_3 \cdot PbCl_2$ has an apparent density of 0.4 g./cm.³. This product is considerably more easily dispersible in plasticized polyvinyl chloride than dibasic lead phosphite which, owing to its needle-shaped crystals easily forms agglomerates. The stabilised synthetic resin shows an excellent electrical volume resistance, while the heat-stabilizing activity of this chlorine-containing product is slightly less than that of dibasic lead phosphite.

EXAMPLE 4

A suspension of 446 g. PbO in 2 l. water is heated to 60° C., which temperature is pretty well maintained during the reaction. While continuously stirring, 5 ml. of 80% acetic acid are first added, and then gradually an amount of 0.25 g. mol of HCl (as an approx. 10% solution). After a reaction time of 15 min., in 10 minutes' time dilute sulphuric acid is added drop by drop to a total amount of 24.5 g. $H_2SO_4$. When the last drops of sulphuric acid are added, there is a colour exchange from yellowish red to colourless. After a few minutes, the divalent lead still in solution is precipitated by the addition of 8 g. $(NH_4)_2SO_4$. The precipitate is filtered off, washed out with hot water and dried at a temperature of 120° C. The dried filter cake is pulverized by allowing it to pass through a sieve-gauze, the meshes of which are 0.3 mm. wide. In this way, a basic lead chloride/sulphate is obtained having an apparent density of 0.63 g./cm.³.

The heat-stabilizing activity and the electrical volume resistance of this product after its addition to polyvinyl chloride are compared with those of tribasic lead sulphate, added in equal parts by weight. The following results are obtained:

| | Brown discolouration when heated to 180° C. | Electrical volume resistance at— | |
|---|---|---|---|
| | | 23° C., ohm⁴·cm. | 60° C., ohm⁴·cm. |
| Basic lead chloride/sulphate | After 120 minutes | $6.5 \times 10^{13}$ | $11.0 \times 10^{11}$ |
| Tribasic lead sulphate | After 105 minutes | $3.9 \times 10^{13}$ | $6.9 \times 10^{11}$ |

EXAMPLE 5

89 g. PbO are suspended in 0.5 l. water, and the mixture is heated to a temperature of 60° C., which temperature is maintained for the remainder of the reaction. After the addition of 1 ml. of 80% acetic acid, 10 ml. of 30% HCl are slowly added drop by drop while stirring, creating a white precipitate of heptabasic lead chloride. 65 ml. of 6% aqueous solution of $SO_2$ are then added, and after completion of the reaction 5 ml. of 25% $NH_4OH$. The solid substance obtained is filtered off, washed out with water and dried, after which the soft filter cake is pulverized. The basic lead chloride/sulphite with the composition $6PbO \cdot PbCl_2 \cdot PbSO_3$ has an apparent density of 0.42 g./cm.³.

A comparison of the heat-stabilizing activity and the electrical volume resistance of this product and of tribasic lead sulphate, added in equal parts by weight to polyvinyl chloride, shows the following results:

| | Brown discolouration when heated to 190° C. | Electrical volume resistance at 23° C., ohm·cm. |
|---|---|---|
| Basic lead chloride/sulphite | After 105 minutes | $5.7 \times 10^{13}$ |
| Tribasic lead sulphate | do | $3.2 \times 10^{13}$ |

What is claimed is:

1. Process for the preparation of complex basic lead compounds of low apparent densities in the range of about 0.29 to 0.63 g./cm.³ and which are excellent as stabilizers for halogen-containing synthetic resins, which comprises reacting in a reaction mixture a suspension of lead oxide in water with hydrochloric acid at a temperature in the range of about 50° C. to 80° C. in the presence of acetic acid, the amount of hydrochloric acid being in the range of about 2.1 g. to 4.7 g. per 1000 g. of lead oxide, and the amount of acetic acid being in the range of about .96 g. to 1.15 g. per 100 g. of lead oxide, and thereafter recovering the product having a chlorine content in the range of about 1.5% to 5.5% by wt.

2. Process as defined by claim 1 wherein an additional acid selected from the group consisting of organic acids, inorganic acids and combinations thereof, is added to the reaction mixture.

3. Process as defined by claim 2 wherein said additional inorganic acid comprises sulfuric acid which is added in an amount to secure in the product a chlorine content in the range from about 1.5 to 4.0% by weight and a sulfate content in the range from about 4.8 to 9.6% by weight.

4. Process as defined by claim 1 wherein said temperature is in the range from about 60° C. to 65° C.

5. Process as defined by claim 1 wherein about 0.017 g. mol of acetic acid is added per 89 g. of lead oxide in water, heated to about 60° C., and then is added about 0.1 g. mol of hydrochloric acid and 5 ml. of 25% ammonium hydroxide.

6. Process as defined by claim 1 wherein the amount of acetic added is about 5 ml. of 80% acetic acid per 446 g. of lead oxide, and wherein about 50 ml. of 30% hydrochloric are added per 446 g. of lead oxide.

7. Process for the production of a complex basic lead-chlorine compound having a low apparent density and excellent as a stabilizer for halogen containing resins which comprises heating an aqueous suspension of lead oxide to an elevated temperature in the range of about 50° C. to 80° C., maintaining said temperature during the rest of the reaction, adding a mixture of acetic acid and sulfuric acid, then slowly adding hydrochloric acid with stirring for about 15 minutes, then adding ammonium sulfate, wherein about 446 g. of lead oxide is used per 5 ml. of 80% acetic acid, per 24.5 grams of sulfuric acid, per 0.25 gram mol of hydrochloric acid, and per 8 g. of ammonium sulfate and recovering the product and drying the same.

8. Process as defined by claim 7 wherein said elevated temperature is about 65° C., and wherein said product is dried at about 120° C.

References Cited

UNITED STATES PATENTS

| | | | |
|---|---|---|---|
| 66,139 | 6/1867 | Fell et al. | 23—85 |
| 587,808 | 7/1897 | Ganelin | 23—85 |
| 2,483,469 | 10/1949 | Kebrich | 23—105 X |
| 3,323,859 | 6/1967 | Szczepanek et al. | 23—105 X |

MILTON WEISSMAN, Primary Examiner

U.S. Cl. X.R.

423—467, 472, 300; 260—37